United States Patent [19]

Osanai

[11] 4,337,488
[45] Jun. 29, 1982

[54] MOTOR CONTROL DEVICE FOR A TAPE RECORDER

[75] Inventor: Akira Osanai, Hachioji, Japan

[73] Assignee: Olympus Optical Co., Ltd., Tokyo, Japan

[21] Appl. No.: 95,076

[22] Filed: Nov. 16, 1979

[30] Foreign Application Priority Data

Nov. 16, 1978 [JP] Japan .................. 53/141617

[51] Int. Cl.³ .................................. G11B 15/26
[52] U.S. Cl. ................................ 360/90; 360/96.3
[58] Field of Search ............. 360/90, 93, 96.1–96.4, 360/73; 318/163, 326

[56] References Cited

U.S. PATENT DOCUMENTS

| 3,005,582 | 10/1961 | Brede | 360/73 |
| 3,046,463 | 7/1962 | Johnson | 360/73 |
| 3,515,921 | 6/1970 | DeLang | 360/73 |
| 3,983,316 | 9/1976 | Schopp | 360/73 |
| 4,196,875 | 4/1980 | Tatekawa et al. | 360/73 |

Primary Examiner—R. S. Tupper

[57] ABSTRACT

A motor control device for a tape recorder, wherein a motor pulley is formed of a magnet whose S and N poles are alternately arranged and acts not only as such but also as a motor control pulse generator.

2 Claims, 4 Drawing Figures

MOTOR CONTROL DEVICE FOR A TAPE RECORDER

BACKGROUND OF THE INVENTION

This invention relates to a device of controlling a motor for the fixed speed tape feed of a tape recorder.

A known device of controlling a motor for the fixed speed tape feed comprises a system of controlling the run of a motor by utilizing electromagnetic pulses. With most of the conventional motor run control devices, a pulse-generating magnet is set in a motor itself. In this case, the motor pulley is only used to transmit the rotation moment of the motor, but not in connection with a pulse-generating magnet.

SUMMARY OF THE INVENTION

It is therefore an object of this invention to provide a compact motor control device of simple arrangement which can control the run of a motor without applying many parts. To this end, this invention provides a motor control device, wherein a motor pulley is formed of a magnet whose S and N poles are alternately arranged to be used as a motor control pulse generator.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

There will now be described by reference to the accompanying drawing a motor control device according to this invention for a tape recorder.

Figure 1:
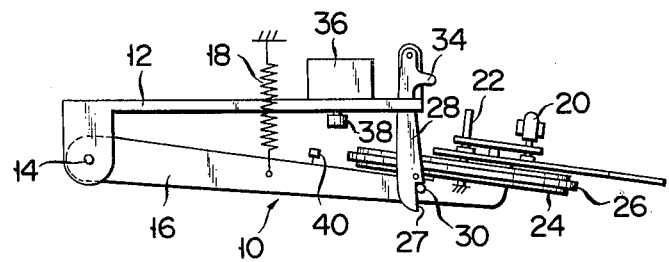
FIG. 1 is a schematic left side view of a tape recorder provided with a motor control device according to this invention, when the movable chassis of the tape recorder is brought down.
Figure 2:
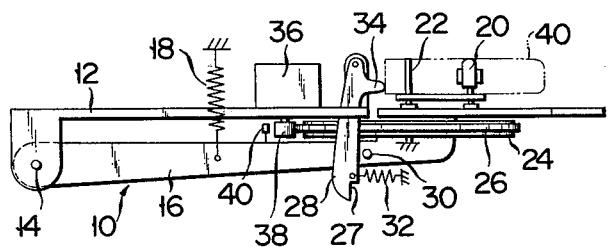
FIG. 2 is a schematic left side view of a tape recorder provided with a motor control device according to this invention, when the movable chassis of the tape recorder is lifted.

As apparent from FIGS. 1 and 2, a movable chassis 16 is rotatably fitted to a fixed chassis 12 of a tape recorder 10 by means of a pivotal pin 14. The movable chassis 16 is urged by a tension spring 18 to be moved toward the fixed chassis 12, that is, to be lifted. A reel 20 and capstan shaft 22 are mounted on the movable chassis 16. Attached to the lower end of the capstan shaft 22 is a flywheel 24, whose periphery is wound with a rubber tire 26.

A hook 28 provided with a notch 27 is rotatably fitted to the fixed chassis 12. An engagement pin 30 is projectively provided on the outer lateral wall of the movable chassis 16. The hook 28 is urged toward the engagement pin 30 by a tension spring 32 (FIG. 2). As seen from FIG. 1, the engagement pin 30 is inserted into the notch 27 while the tape recorder 10 stands at rest, thereby causing the movable chassis 16 to be kept in a lowered state. An engagement-releasing knob 34 is formed on the same lateral side of the hook 28 as that on which the notch 27 is provided.

Figure 3:
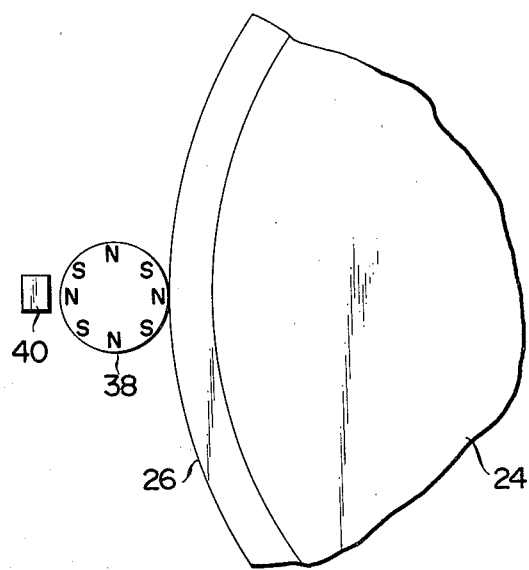
FIG. 3 is an enlarged top plan view of a motor pulley and a maagnetism-sensitive element.

A motor 36 is mounted on the fixed chassis 12. A motor pulley 38 is formed of a magnet whose S and N poles are alternately arranged (FIG. 3). A magnetism-sensitive element 40 is so positioned as to face the motor pulley 38. As indicated in FIG. 2, the magnetism-sensitive element 40 is set on the movable chassis 16. However, it is possible to fit the magnetism-sensitive element 40 to the fixed chassis 12. The motor pulley 38 formed of a magnet helps to reduce the number of parts of a motor control device and the space occupied thereby.

Figure 4:
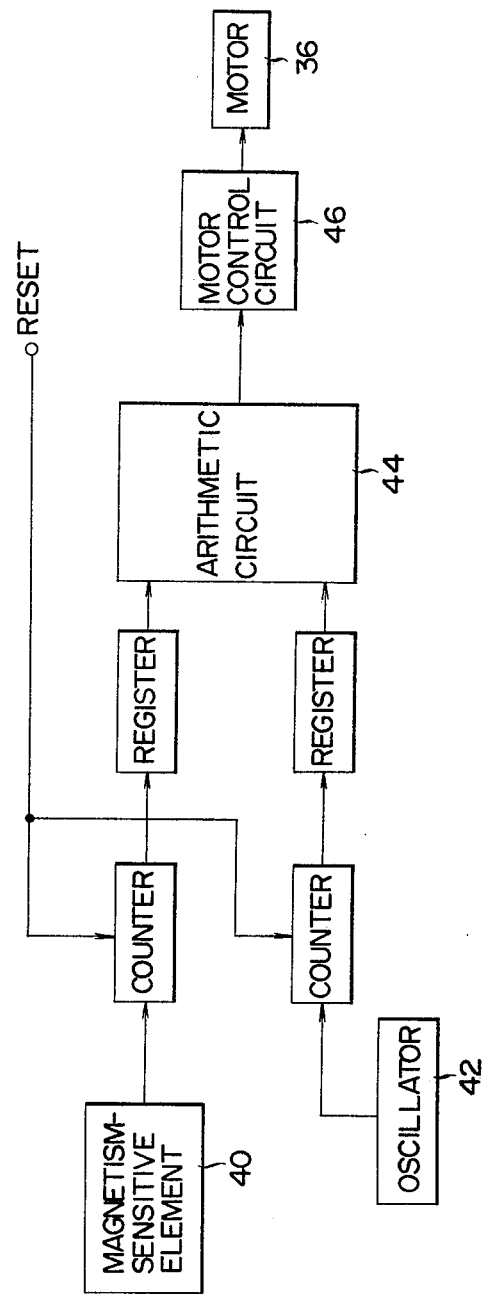
FIG. 4 is a block circuit diagram for control of magnetic pulses.

Magnetic pulses generated by the rotation of the motor pulley 38 are detected by the magnetism-sensitive element 40. An electric signal converted from the magnetic pulse is processed, as shown in FIG. 4, in an arithmetic circuit 44 together with a referential signal issued from an oscillator 42. The result of the arithmetic process is supplied to a motor control circuit 46 to control the fixed speed rotation of the motor 36. While the motor 36 mounted on the fixed chassis 12 stands at rest, the flywheel 24 set on the movable chassis 16 is removed from the motor pulley 38 disposed on the fixed chassis 12, thereby completely preventing the deformation of the rubber tire 26 of the flywheel 24. The motor 36 is set on the fixed chassis 12, instead of on the movable chassis 16. This arrangement decreases the magnitude of a movable chassis operating force which might otherwise be required and is preferred from the standpoint of preventing the shaking of the motor 36 and the possible rolling of the movable chassis 16.

The movable chassis 16 is lifted by inserting a cassette tape 40 in a prescribed position and pressing the engagement-releasing knob 34.

Where, in this case, the engagement-releasing knob 34 is pressed against the urging force of the tension spring 32, then the engagement pin 30 is disengaged from the notch 27. As a result, the movable chassis 16 is swung upward while being rotated about the pivotal pin 14. At the rise of the movable chassis 16, the flywheel 24 is connected to the motor pulley 38 by means of the rubber tire 26, causing the rotation moment of the motor 36 to be transferred to the capstan shaft 22. With the motor control device of this invention, the motor pulley 38 and flywheel 24 are not directly connected together by, for example, a rubber belt when the tape recorder is made ready for recording or reproduction as is the case with the prior art motor control device. As a result, the motor pulley 38 and flywheel 24 are directly coupled to each other, and rotated in the opposite directions, thereby providing an antirolling effect for the assembly of the motor pulley 38 and flywheel 24. After reproduction and recording, the tape recorder is brought to rest by removing the cassette tape 40, bringing the movable chassis 16 downward, and engaging the engagement pin 30 with the notch 27.

As mentioned above, this invention provides a motor control device in which the motor pulley 38 is formed of a magnet whose S and N poles are alternately arranged, thereby reducing the number of parts of a tape recorder and consequently the space occupied thereby.

What is claimed is:
1. In combination of a tape recorder;
    a drive motor having an output shaft;
    a driven member including a capstan shaft having a flywheel thereon;

a motor pulley mounted on said output shaft and adapted to abut on said flywheel for transmitting driving force thereto;

a magnetically sensitive element arranged adjacent to said motor pulley, said motor pulley being a magnet having S and N poles alternatively arranged thereon; and said pulley and magnetically sensitive element being operatively connected to said motor and forming a control pulse generator for said motor.

2. The combination of claim 1, wherein said tape recorder includes a fixed chassis having said motor and motor pulley mounted thereon, and also includes a movable chassis having a flywheel and capstan shaft mounted thereon, said movable chassis being movable from a first position in which said motor pulley and flywheel are separated from each other to a second position in which they engage each other, and vice versa.

* * * * *